(12) United States Patent
AlYousef et al.

(10) Patent No.: US 11,867,036 B2
(45) Date of Patent: Jan. 9, 2024

(54) INSITU FOAM GENERATION TO FASTEN AND INCREASE OIL PRODUCTION RATES IN GRAVITY DRAINAGE $CO_2$ GAS INJECTION

(71) Applicant: SAUDI ARABIAN OIL COMPANY, Dhahran (SA)

(72) Inventors: Zuhair AlYousef, Saihat (SA); Subhash Ayirala, Dhahran (SA); Ali Abdullah Altaq, Qatif (SA); Muhammad Majid Almajid, Qatif (SA); Dong Kyu Cha, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/355,908

(22) Filed: Jun. 23, 2021

(65) Prior Publication Data

US 2022/0412197 A1    Dec. 29, 2022

(51) Int. Cl.
*E21B 43/16* (2006.01)
*C09K 8/594* (2006.01)
(Continued)

(52) U.S. Cl.
CPC ............ *E21B 43/164* (2013.01); *C09K 8/594* (2013.01); *E21B 43/25* (2013.01)

(58) Field of Classification Search
CPC .... E21B 43/243; E21B 41/0064; E21B 36/00; E21B 37/06; E21B 43/267; E21B 43/26;
(Continued)

(56) References Cited

U.S. PATENT DOCUMENTS 4,706,752 A    11/1987 Holm
4,846,277 A    7/1989 Khalil et al.
(Continued)

FOREIGN PATENT DOCUMENTS

CA    2648540 A1 *  7/2009    .......... E21B 43/243
CN    101671553 B    3/2012
(Continued)

OTHER PUBLICATIONS

Farajzadeh, Rouhollah et al., "Effect of Gas Permeability and Solubility on Foam"; Journal of Soft Matter; vol. 2014, Article ID 145352; pp. 1-7; Nov. 30, 2014 (7 pages).
(Continued)

*Primary Examiner* — Zakiya W Bates
(74) *Attorney, Agent, or Firm* — Osha Bergman Watanabe & Burton LLP

(57) ABSTRACT

A method for recovering hydrocarbons from a hydrocarbon bearing formation includes introducing a first solution having a first salt into the hydrocarbon bearing formation. A second solution is also introduced into the hydrocarbon bearing formation, wherein the second solution has a second salt and a foaming agent. The first salt and the second salt produces a nitrogen gas, and the nitrogen gas and the foaming agent produces a foam formed in-situ within the formation. The foam forms a foam barrier, and carbon dioxide is introduced into the formation to form a gas cap, wherein the carbon dioxide gas cap has a gas front that is separated from the hydrocarbons by the foam barrier.

10 Claims, 8 Drawing Sheets

(51) Int. Cl.
*E21B 43/25* (2006.01)
*E21B 43/22* (2006.01)

(58) Field of Classification Search
CPC ... E21B 43/2405; E21B 43/2408; E21B 43/16
See application file for complete search history.

(56) References Cited

U.S. PATENT DOCUMENTS

| | | | |
|---|---|---|---|
| 5,005,644 | A | 4/1991 | Wall et al. |
| 10,808,511 | B2 | 10/2020 | Gomaa et al. |
| 2007/0215347 | A1 | 9/2007 | Tang |
| 2012/0285694 | A1 | 11/2012 | Morvan et al. |
| 2014/0151041 | A1 | 6/2014 | Hernandez Altamirano et al. |
| 2017/0044425 | A1 | 2/2017 | Barati Ghahfarokhi |
| 2021/0062630 | A1 | 3/2021 | AlYousif et al. |

FOREIGN PATENT DOCUMENTS

| | | |
|---|---|---|
| CN | 102536166 B | 1/2015 |
| CN | 105114046 A | 12/2015 |
| EP | 3 162 872 A1 | 5/2017 |
| RU | 2 236 575 C2 | 9/2004 |
| RU | 2 250 364 C2 | 4/2005 |
| WO | 2013/184116 A1 | 12/2013 |
| WO | 2015/135777 A2 | 9/2015 |
| WO | 2020/092697 A2 | 5/2020 |
| WO | 2021247059 A1 | 12/2021 |

OTHER PUBLICATIONS

Rao, D. N. et al., "Development of Gas Assisted Gravity Drainage (GAGD) Process for Improved Light Oil Recovery"; Proceedings of the SPE/DOE Symposium on Improved Oil Recovery; Paper No. SPE-89357-MS; pp. 1-12; Apr. 17-21, 2004 (12 pages).

Kasiri, Norollah et al., "Gas-Assisted Gravity Drainage (GAGD) Process for Improved Oil Recovery"; Proceedings of the International Petroleum Technology Conference; Paper No. IPTC-13244-MS; pp. 1-7; Dec. 7-9, 2009 (7 pages).

Akhlaghi, N. et al., "Gas Assisted Gravity Drainage by CO2 Injection"; Energy Sources, Part A: Recovery, Utilization, and Environmental Effects; vol. 34, Issue 17; pp. 1619-1627; 2012 (9 pages).

Borchardt, J.K. et al., "Foaming Agents for EOR: Correlation of Surfactant Performance Properties With Chemical Structure"; Proceedings of the SPE International Symposium on Oilfield Chemistry; Paper No. SPE-16279-MS; pp. 395-413; Feb. 4-6, 1987 (19 pages).

Al-Mudhafar, Watheq J. et al., "Lessons Learned from the Field-Scale Simulation of the Gas-Assisted Gravity Drainage GAGD Process in Heterogeneous Sandstone Oil Reservoirs"; Proceedings of the SPE Western Regional Meeting; Paper No. SPE-185732-MS; pp. 1-32; Apr. 23-27, 2017 (32 pages).

Al-Mudhafar, Watheq J. et al., "Effect of Gas Injection Pressure on the Performance of CO2-Assisted Gravity Drainage Process in Heterogeneous Clastic Reservoirs"; Proceedings of the SPE Asia Pacific Oil and Gas Conference and Exhibition; Paper No. SPE-192023-MS; pp. 1-13; Oct. 23-25, 2018 (13 pages).

Sahajwalla et al., "Factors Influencing the Process Efficiency of Gas-Stirred Ladles," The Centre for Metallurgical Process Engineering, The University of Britsh Columbia, Oct. 1989, 4 pages.

International Search Report Issued in Corresponding Application No. PCT/US2022/034767, dated Sep. 27, 2022, 5 pages.

Written Opinion Issued in Corresponding Application No. PCT/US2022/034767, dated Sep. 27, 2022, 7 pages.

\* cited by examiner

INSITU FOAM GENERATION TO FASTEN AND INCREASE OIL PRODUCTION RATES IN GRAVITY DRAINAGE CO₂ GAS INJECTION

BACKGROUND

Gravity drainage carbon dioxide ($CO_2$) gas injection is used for tertiary oil recovery in reservoirs. Gravity drainage $CO_2$ gas injection is a top-down oriented process that mobilizes residual oil. $CO_2$ gas may be introduced at the top of a pay zone in a reservoir using either vertical or horizontal producing wellbores to form a gas cap updip. The gas cap expands with time to improve the sweep and mobilize the residual oil. The mobilized oil moves towards the down dip and drains down to the horizontal recovery wellbore through film flow and gravity drainage.

The injected $CO_2$ gas provides favorable interactions with the residual oil such as oil swelling, viscosity reduction, and lowering gas-oil interfacial tension (IFT). At critical or supercritical conditions, $CO_2$ has miscibility that results in near-zero gas-oil interfacial tension with crude oil. The relative miniscule interfacial tension effectively mobilizes residual, heavy, and highly-polar portions of crude oil in the treated portions of the reservoir. Mobilized, the crude oil flows downward in the reservoir towards the recovery wellbore. Such crude oil drainage occurs through a combination of both film flow, caused by interaction with and absorption of some of the $CO_2$, and gravity drainage.

It is desirable to control the interface between the advancing injection gas and the produced oil phase to stabilize gravitational forces and the downward movement of the gas-oil interface with the controlled production withdrawal rate.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method for recovering hydrocarbons from a hydrocarbon bearing formation. The method may include introducing a first solution having a first salt into the hydrocarbon bearing formation. The method may also include introducing a second solution into the hydrocarbon bearing formation, wherein the second solution may include a second salt and a foaming agent. The first salt and the second salt may produce a nitrogen gas, and the nitrogen gas and the foaming agent may produce a foam formed in-situ within the formation. The foam may form a foam barrier around a portion of the hydrocarbon bearing formation. Carbon dioxide may be introduced into the formation to form a gas cap, wherein the carbon dioxide gas cap has a gas front that is separated from the hydrocarbons by the foam barrier.

In another aspect, embodiments disclosed herein relate to a method for recovering hydrocarbons from a hydrocarbon bearing formation. The method may include introducing a foaming agent, a first salt, and a second salt into the hydrocarbon bearing formation. The method may also include contacting the first salt, the second salt, and the foaming agent in the hydrocarbon bearing formation, wherein the first salt and the second salt produce a nitrogen gas, and such that the nitrogen gas and the foaming agent intimately intermingle and form a foam barrier in the hydrocarbon bearing formation. The method may also include introducing carbon dioxide into the hydrocarbon bearing formation such that a carbon dioxide gas cap forms above the foam barrier, where the carbon dioxide is introduced at a flow rate greater than the critical gas injection rate.

In yet another aspect, embodiments disclosed herein relate to a system for recovering hydrocarbons from a hydrocarbon bearing formation. The system may include at least one injection well. The injection well may include a first tubing configured to contain a first salt solution and a second tubing configured to contain a second salt solution, wherein an outlet of the first tubing and an outlet second tubing are proximate to a target zone in the hydrocarbon bearing formation. The first salt solution may include a first salt and water, and the second salt solution may include a second salt, a foaming agent, and water, wherein the first salt and the second salt may be configured to spontaneously react in the target zone of the hydrocarbon bearing formation.

Other aspects and advantages of the claimed subject matter will be apparent from the following description and the appended claims.

DETAILED DESCRIPTION

Figure 1:
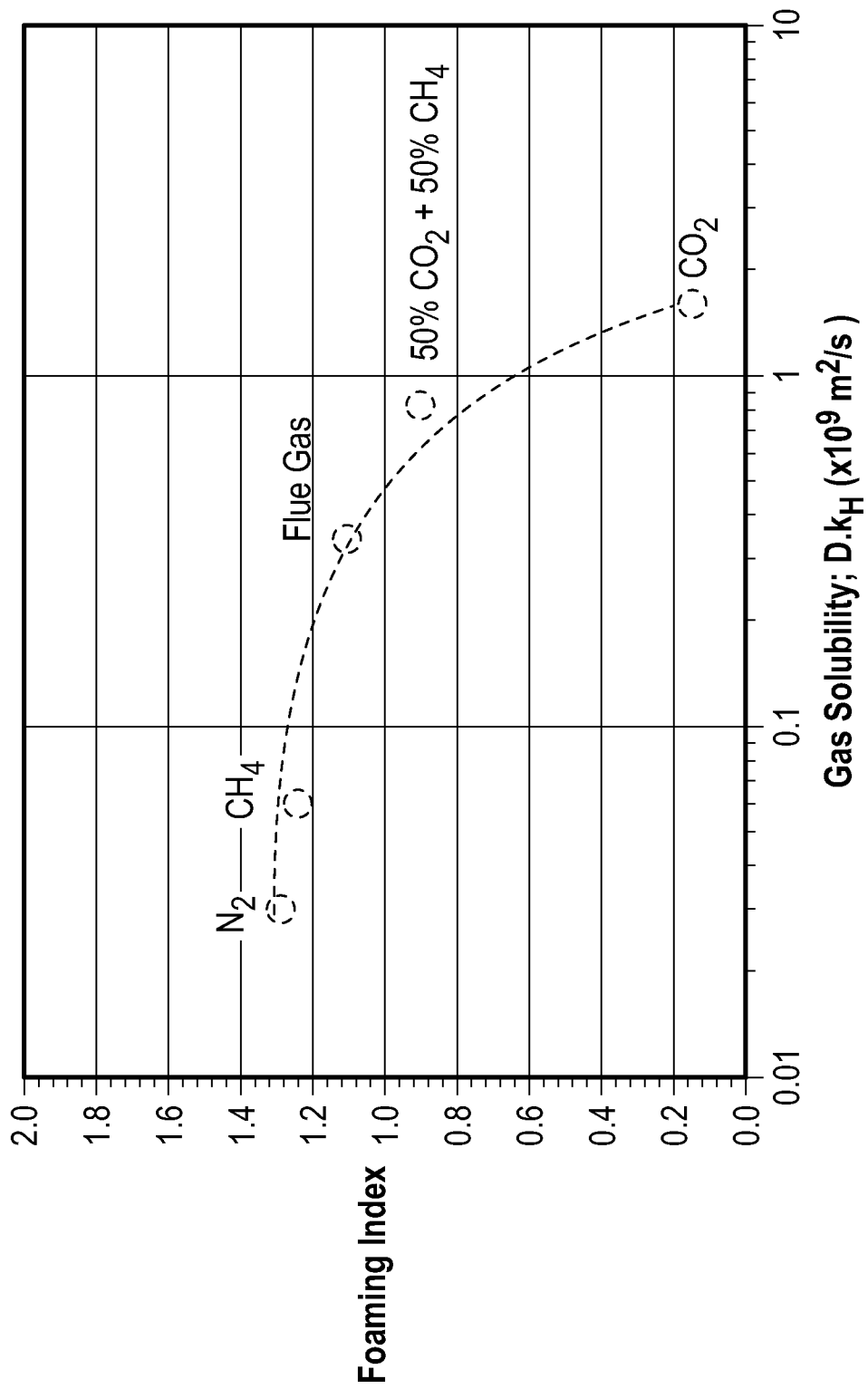
FIG. 1 is a graph of the foaming index and gas solubility of gases.

Embodiments disclosed herein may be utilized with gas-assisted gravity drainage enhanced oil recovery (GAGD-EOR) methods, where a combination of $CO_2$ injection and gravity drainage may be used for aiding oil production. In GAGD-EOR methods, injected $CO_2$ may accumulate at the top of a reservoir pay zone due to gravity segregation, which may displace and drain oil to a lower horizontal producing (recovery) wellbore. The "critical gas injection rate" is an important operational parameter for GAGD-EOR processes and refers to the rate of carbon dioxide injection into a reservoir at which the injected gas moves through the oil zone, leading to premature breakthrough across a $CO_2$/oil interface. At a given gas injection rate, relatively higher oil production rates may also lead to early gas breakthrough. Thus, precise control of gas injection rates relative to oil production rates may be useful for the success of GAGD-EOR methods. According to embodiments disclosed herein, a gas-driven EOR technique may be effectively changed to a gravity dominated flow regime, thereby controlling the rates at which gas may be injected to produce oil. Controlling the gas injection rate may be useful in mitigating premature breakthrough, viscous fingering, as well as coning by improving the control of the sweep efficiency via controlling the gas rate. The critical injection rate for a given project may be determined via coreflooding experiments and reservoir simulators.

During GAGD-EOR treatment, the $CO_2$/oil interface may move downward towards a recovery wellbore. The recovery wellbore may have perforations and may be positioned near the bottom of the reservoir. It is desirable to keep a stable interface between the crude oil and the treatment carbon dioxide to prevent premature breakthrough of the carbon dioxide through the crude oil, also referred to as short-circuiting.

Short circuiting may be the result of what is referred to in the EOR arts as "fingering" or "viscous fingering" and may commence in a reservoir when the gas injection rate is at or above the critical gas injection rate. Fingering may be caused by the difference in the viscosity of the (crude) oil and the injected fluid, such as carbon dioxide.

Because of factors such as differences in the viscosity between crude oil and carbon dioxide, the carbon dioxide can "push" crude oil aside and create "fingers" of carbon dioxide in the formation with too much fluid flow or pressure. These fingers may reach from the point of introduction towards the point of recovery, bypassing other areas of the formation that have not been treated. This may lead to premature breakthrough of the carbon dioxide at the recovery wellbore, resulting in wasted injection fluid. In the event of a breakthrough, if the situation is not mitigated, a greater injection fluid flow rate of the carbon dioxide may be required to maintain pressure in the reservoir and to provide the possibility of treatment to the non-treated portions of the wellbore as the injection fluid ($CO_2$) will flow through the previously treated portion of the formation via the flow path created by the viscous fingering.

Short circuiting may also be a result of gas channeling, due to the heterogeneity of the reservoir including permeability contrast. For example, channeling may result when injected $CO_2$ gas is unequally distributed due to high permeability of fractures present in heterogenous formations. Similar to viscous fingering, gas channeling may also lead to premature breakthrough of $CO_2$ at the recovery wellbore, resulting in wasted injection fluid.

A mobility ratio for the injected gas refers to the ratio of the effective (relative) permeability to phase viscosity and may be used to predict the occurrence of short circuiting. The mobility ratio may be calculated from the mobility of the displacing fluid behind the gas front divided by the mobility of the displaced fluid $\lambda_d$. In a displacement process, a mobility ratio that is greater than 1 is considered unfavorable, while a mobility ratio that is less than 1 is considered favorable. If the mobility ratio is greater than 1, then channeling and fingering may occur during the injection process. For example, in a $CO_2$ gas injection process, $CO_2$ is much less viscous than reservoir fluids (crude oil) and due to the reservoir heterogeneity in combination with the differences in viscosity, viscous fingering and channeling may be common during $CO_2$ flood process.

To prevent short circuiting, the $CO_2$ injection rate may be maintained at less than the critical gas injection rate such that the oil production rate is balanced by equivalent $CO_2$ injection volume. By balancing the crude oil production volume with the $CO_2$ injection volume at a rate less than the critical gas injection rate, the $CO_2$/crude oil interface may remain stable in that the same amount of $CO_2$ displaces the same amount of crude oil produced. In doing so, the $CO_2$/crude oil interface may advance downward and as the combined forces of mobilization due to exposure to $CO_2$, gravity, and an amount of force applied by the $CO_2$ at the $CO_2$/crude oil interface, displace the produced crude oil. Although the introduction rate of the $CO_2$ is less than the critical gas injection rate, the balanced production may result in preventing treatment fluid bypass of the $CO_2$/crude oil interface and may stabilize the treatment of the formation.

Heterogeneity of the formation may impact the $CO_2$ injection rate. Heterogeneity of reservoirs may manifest in several ways, including streaks of discontinuous formation composition, such as intrusions, faults, and fractures. Wide variations within an otherwise homogeneous formation in porosity and permeability of the pore structure may also make a reservoir behave as if it was heterogenous in structure. Maintaining a steady relationship between $CO_2$ injection and crude oil production to maintain a smooth $CO_2$/crude oil interface and treatment of the reservoir is challenging when encountering such areas of discontinuity and high permeability.

A useful method of treating a formation may include an increase of the carbon dioxide injection rate up to and beyond the critical injection gas rate, where short circuiting via viscous fingering or gas channeling may be prevented, and the viscosity of the treatment fluid and the crude oil may not affect the recovery. In addition, the method of treatment should also be able to maintain stable growth and movement of the $CO_2$/crude oil interface as it moves towards the downdip. A useful method of treating a formation may also mitigate the heterogeneously of the reservoir being treated—to prevent any structural bypass of the treatment fluid regardless of the carbon dioxide injection rate. In such a treatment, the crude oil production rate and the sweep effectiveness of the treatment may both increase, leading to greater and faster crude oil production.

In one aspect, embodiments disclosed herein relate to a treatment of a gravity drainage $CO_2$ injection EOR technique for recovering hydrocarbons from a hydrocarbon bearing formation.

Embodiments of the present disclosure may include a treatment to a gravity drainage $CO_2$ gas injection, wherein a spontaneous in-situ reaction between two salts in the presence of a foaming agent (surfactant) generate a foam. The foam may form a blockage in areas of high permeability, wherein subsequently injected carbon dioxide gas may be prevented from flowing, thereby mitigating the potential of short circuiting.

Embodiments of the present disclosure may include contacting a first aqueous solution comprising a first salt with a second aqueous solution comprising a second salt in the presence of a forming agent within a target zone in a formation. The target zone, or target depth, is the area within the formation wherein the first salt and second salt come into contact. The resulting spontaneous reaction between the first salt and the second salt in the presence of the foaming agent may generate a nitrogen-based foam barrier in-situ. The foam may generate in and/or propagate to zones of high permeability in the formation.

In embodiments of the present disclosure, the introduction of a first solution with a first salt, a second solution with a second salt, and a foaming agent in the reservoir may form a foam barrier in-situ. The in-situ foam formation may occur near the upper part of the reservoir, and near or at zones of high permeability. The foam may propagate (flow) to high permeability streaks and may block these zones. Since the foam may be more viscous than the injected $CO_2$, the injected $CO_2$ may be blocked from flowing through the blocked high permeability streaks. In some embodiments, the flow paths that the foam flows towards may sporadically change with time. As foam flows into the least resistive pathways, the pressure gradient necessary to instigate the flow may increase in the least resistive pathways until flow ceases. At that time, foam may divert the subsequent $CO_2$-foam or $CO_2$ into other pathways. In some embodiments, the foam may temporarily settle but may resume flow once the pressure gradient exceeds the pressure needed to instigate flow in a given pathway. In this way, it is envisioned that the foam may form a barrier, wherein the barrier at least partially physically separates the carbon dioxide from the crude oil so that the carbon dioxide gas chamber (gas cap) is slowed or prevented from flowing through zones that pose a high risk of viscous fingering and/or gas channeling.

In embodiments of the present disclosure, the foam may be present in areas of high conductivity. Fluid, including injected fluid and foam formed in accordance with embodiments of the present disclosure, may flow in the pathways of low resistance, also referred to as high permeability pathways or zones. The foam generated in the formation may flow and block these zones of high permeability and allow the subsequently-injected $CO_2$ to flow to the lower permeability zones. The formed foam blockages, or barrier, may reduce the relative permeability through the formation and, consequently, increase the critical gas injection rate for the subsequent $CO_2$ gravity drainage process. Additionally, the expansion of the gas front may be more uniform because the foam may equalize the resistances in across different pathways. In such manner, the foam barrier may prevent the carbon dioxide above the $CO_2$/crude oil interface from breaking through, thus preventing viscous fingering and/or gas channeling.

Embodiments of the present disclosure may include generating a nitrogen gas foam in-situ to form at least a partial foam barrier between the $CO_2$ gas and the crude oil. The foam generated by the produced nitrogen gas may be a resilient foam, particularly in terms of strength and solubility in an aqueous phase.

Foams tend to become weaker as the solubility of gas increases in the aqueous phase. As shown in FIG. 1, the foaming index of certain gases decreases with an increase of gas solubility. For example, nitrogen gas data in FIG. 1 shows a high foaming index due to the low solubility of nitrogen gas, as compared to carbon dioxide data which shows a low foaming index due to a high solubility in an aqueous phase. Flue gas, comprising mostly of nitrogen, also shows a higher foaming index, according to the data in FIG. 1. A gas with a lower foaming index may require a higher amount of gas to generate the same volume of foam produced by a gas with a higher foaming index, and thereby a gas with a lower foaming index may possess poor foaming behavior. Also, foams generated with gases with a high solubility in the aqueous phase may be less stable due to a higher liquid drainage rate. Thus, foams formed with nitrogen gas, as in embodiments of the present disclosure, may be more stable due to increased foaming efficiency and higher foaming index. The strength and low solubility of nitrogen foam according to embodiments of the present disclosure may provide effective blockages, or barriers, to prevent $CO_2$ injection gas from flowing through high permeability zones, thereby reducing the amount of carbon dioxide required in a gravity drainage $CO_2$ gas injection process.

The foaming index may be impacted by many parameters, including gas composition and saturation, capillary pressure, type of surfactant, brine salinity, concentration of surfactant, presence of crude oil, adsorption of surfactant on rock minerals, type of gas, temperature, pressure, and solubility. These parameters may impact the foamability (ability to generate foams) and stability (how long the generated foam lasts). For example, one key parameter is the solubility of the gas in the aqueous phase. Foams tend to become weaker as the solubility of gas increases in the aqueous phase. When compared to other gases, $CO_2$ has the highest solubility in the aqueous phase, which significantly impacts the foaming index. Foam quality can be written as: $Q_g/(Q_g+Q_w)$, where $Q_g$ is the gas flow rate, $Q_w$ is the rate of the diluted surfactant solution and reflects the amount of gas to the total amount of liquid and gas used in the foam. In embodiments of the present disclosure, the foam quality may be controlled by the added amount of each salt as this may impact the amount of generated nitrogen.

According to embodiments of the present disclosure, the foam barrier may comprise nitrogen gas produced by contacting two reactants in-situ. The nitrogen gas foam generated in-situ may have the mobility to move through the formation once formed and collectively, and potentially temporarily, settle at the $CO_2$/crude oil interface, but not so much mobility as to be pushed aside by carbon dioxide attempting to bypass, especially through zones of high permeability. In such a configuration, the foam barrier may provide a layered physical barrier to the injected carbon dioxide. The foam barrier may be "pushed" against by the carbon dioxide in order for the carbon dioxide to continue to advance down the formation. This downward force may, in turn, further displace crude oil and provide for its production at the bottom of the reservoir via a recovery wellbore.

In some embodiments of the present disclosure, the foam barrier may be a continuous barrier. In some embodiments, the foam barrier may not be continuous. The continuity of the foam barrier may depend on the amount of foam generated in-situ, as well as the amount and volume of foam required to block the high permeability zones.

Embodiments of the present disclosure may include carbon dioxide in various phases, including gas, liquid, critical and supercritical phase.

Embodiments of the present disclosure may include the utilization of a nitrogen gas generating reaction where two salts react spontaneously upon contact within the target zone. The generated nitrogen gas may form a resilient foam comprising the nitrogen gas and a foaming agent. According to embodiments of the present disclosure, the nitrogen gas foam generated by the reactants may form at least partial layer between the $CO_2$/crude oil interface and mitigate high permeability zones. The carbon dioxide may then be introduced at a fluid flow rate that is greater than the critical gas injection rate because of the lower risk of short circuiting of the carbon dioxide. In some embodiments of the present disclosure, this greater-than-critical gas injection rate may then push the foam barrier downwards towards the recovery wellbore at a rate that is greater than without the foam barrier, forcing crude oil in the bottom of the reservoir into the recovery wellbore at a greater flow rate than possible without.

In some embodiments of the present disclosure, the pressure of the carbon dioxide gas cap may also be increased forming a $CO_2$ cap above the foam barrier, and in some embodiments, form a supercritical $CO_2$ cap above the foam barrier where the foam may block high permeability streaks and allow the carbon dioxide to produce the oil from the unswept zones. The increased pressure of the carbon dioxide gas cap may assist in "seating" the foam barrier into high fluid conductivity channels and at the $CO_2$/crude oil interface. As the carbon dioxide gas cap expands downward, any residual crude oil remaining in the previously treated portion of the reservoir may be exposed to the higher-pressure $CO_2$ and may be motivated to flow. Highly polar organics, such as aromatics, naphthalenes, and asphaltenes, may be mobilized by contact with the carbon dioxide in the gas cap as it sweeps downward towards the recovery well. The newly motivated hydrocarbons may be carried downward toward the production well by the advancing $CO_2$/crude oil/foam barrier front.

Embodiments of the present disclosure may include contacting two reactants in the presence of a foaming agent in-situ to generate the foam barrier comprising nitrogen gas. The injection of the two reactants may be simultaneous. By injecting the reactants simultaneously into the target zone, the first and second solutions may mix near the wellbore and generate foam. The first and second solutions may be aqueous solutions. In embodiments of the present disclosure, the first salt may include $NH_4Cl$ and the second salt may include $NaNO_2$. In embodiments of the present disclosure, a foaming agent, also referred to as a surfactant, may be present in the target zone. In some embodiments of the present disclosure, the first solution or the second solution, or both, may comprise a foaming agent.

In embodiments of the present disclosure, the solutions may be prepared uphole, and may be prepared onsite. In some embodiments of the present disclosure, the first solution may be prepared by blending or mixing at least the first salt with water. In some embodiments of the present disclosure, the second solution may be prepared by blending or mixing at least the second salt, water, and a foaming agent. According to embodiments of the present disclosure, the solutions may be prepared in a batch-process. Embodiments of the present disclosure may require between 1 to 5 batch processes, depending on field conditions and parameters.

According to embodiments of the present disclosure, the water source for the solutions may include deionized water, high salinity seawater, low salinity brine, treated produced water, and various injection brines.

In embodiments of the present disclosure, the molarity of the salts present in the first and second solutions may impact the rate of reaction between the salts in the target zone. For example, the molarity of $NaNO_2$ may be up to double that of the molarity of $NH_4Cl$ to expedite the reaction. The molarity of the salts may be the same in each solution, however, this may result in a slower reaction.

In one or more embodiments of the present disclosure, the first solution comprising a first salt may be injected into a reservoir formation. The second solution comprising a second salt may be injected into the reservoir formation wherein the second salt may contact the first salt in a target zone of the reservoir formation. The solutions may be injected into the target zone, wherein the solutions do not contact each other until the solutions reach the target zone. For example, the first solution may be injected via a coiled tubing while second solution may be injected through a second tubing physically separated from the coiled tubing, wherein the outlets of the coiled tubing and the second tubing are positioned proximate to each other in the target zone. The second tubing may include a production tubing or an additional coiled tubing.

In some embodiments of the present disclosure, the outlet of the coiled tubing may be positioned in the target zone, wherein the coiled tubing may be configured to move up or through the reservoir, particularly the areas of high permeability. As the first salt solution may be injected through the coiled tubing, wherein it may contact the second salt solution in the target zone, the position of the coiled tubing may be adjusted such that the volume ratio of the first and second salt solution remains 1:1 as the coiled tubing moves through the target zone after adjusting the concentration based on the kinetic reaction of the two salts.

The reaction between the salts according to embodiments of the present disclosure may be catalyzed by an activator, such as heat and/or pH level of the reaction location. For example, in embodiments wherein the reservoir temperature, particularly the target zone, is about 60° C. or higher, a $NH_4Cl$ salt solution may spontaneously react with a $NaNO_2$ salt solution, as shown in Reaction (1):

$$NaNO_2 + NH_4Cl \rightarrow NaCl + H_2O + N_2 \uparrow \text{Reaction} \qquad (1)$$

($\Delta HR_x = -79.95$ kcal mol$^{-1}$, irreversible $K_{eq} = 3.9 \times 1071$ Pa×mole m$^{-3}$ at 25° C.)

In Reaction (1), $\Delta HR_x$ is the change in the heat of reaction and $K_{eq}$ is the equilibrium constant for the irreversible reaction. As shown in Reaction (1), the reaction between the salts produces nitrogen gas. In embodiments of the present disclosure, the nitrogen gas product may produce a nitrogen gas foam in the presence of a foaming agent. The nitrogen gas foam may generate in-situ, thus alleviating the need for an external gas injection to product in-situ foam in the target zone.

In some embodiments of the present disclosure, the target zone may not be at the necessary elevated temperature to catalyze a spontaneous reaction between the salts. In these embodiments, the reaction may be triggered by lowering the pH value of at least one salt solution to about 3.0 to 5.0. For example, acetic acid may be added to the $NH_4Cl$ solution to lower the pH to about 3.0 to 5.0 to catalyze a spontaneous reaction with the $NaNO_2$ salt solution. In some embodiments, the pH of the target zone may be lowered to trigger the reaction by adding acids to the target zone. For example, acetic acid may be injected into the target zone to lower the pH.

Although $NH_4Cl$ and $NaNO_2$ are provided as examples of salts according to embodiments of the present disclosure, other salts may be used, including various ammonium salts with nitrite. Examples of nitrogen-containing salt compounds include ammonium acetate, ammonium formate, ethylene diamine, formamide, acetamide, urea, benzyl urea, butyl urea, and lower alcohol esters of the lower fatty acids, such as hydrazine and phenylhydrazine hydrochloride. Examples of suitable ammonium salts include ammonium formate or ammonium nitrate.

The foaming agent may be injected into the target zone with the first solution, the second solution, or in a foaming agent injection process wherein the foaming agent is present in the target zone at the time of contact between the two salt reactants.

Figure 2:
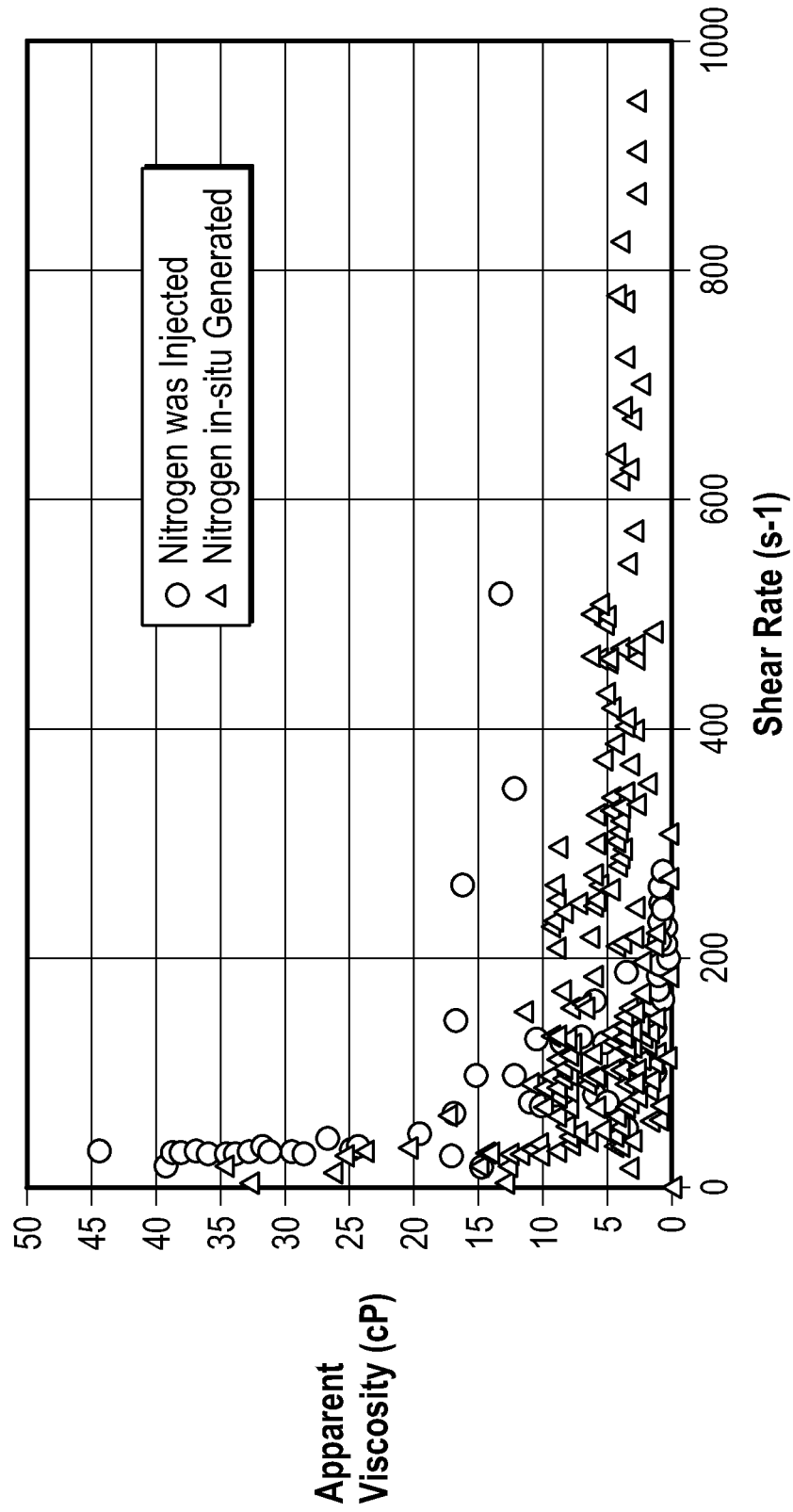
FIG. 2 is a graph of the apparent viscosity and shear rate of foaming systems.

FIG. 2 shows the viscosity measurements in foam generated using a nitrogen gas injection method with a surfactant solution, and foam generated by nitrogen produced by a spontaneous reaction between two salts in accordance with the reaction of embodiments of the present disclosure. The viscosity of the foams produced using the nitrogen gas injection method and the nitrogen gas generated in-situ method, present very similar results. Accordingly, the foam generated in-situ may provide the same advantages of a nitrogen gas injected foam without the need for nitrogen gas injection into the reservoir.

Embodiments of the present disclosure may include a foaming agent. The foaming agent may be mixed with the first solution, the second solution, or both. The foaming agent may be a nonionic surfactant, anionic surfactant, cationic surfactant, amphoteric surfactant, and combinations thereof. Examples of surfactants include, alpha olefin sulfonates, internal olefin sulfonates, alcohol ethoxylates, alkyl amines, and cocaamidopropyl hydroxysultaine.

In addition to the gas present in the foam as previously described, several parameters and field conditions may impact the foam generation and stabilization, including reservoir temperature, brine salinity, saturations, presence of crude oil, reservoir rock composition and physical properties, and rock-fluid interactions. In embodiments where the foaming agent is present in the first and/or second salt solution, the composition and concentration of the foaming agent in the given salt solution may depend on these various parameters and field conditions. In some embodiments of the present disclosure, the foaming agent concentration in the given salt solution may be between 0.10 wt % to 5 wt % (weight percent).

According to embodiments of the present disclosure, the results of the use of the foam barrier, with the low solubility in water and crude oil, and increased $CO_2$ flow rate and pressure, may increase overall crude oil production from the hydrocarbon bearing formation but also increased recovery of the oil in place by exposure to $CO_2$, such as supercritical $CO_2$.

Figure 3:
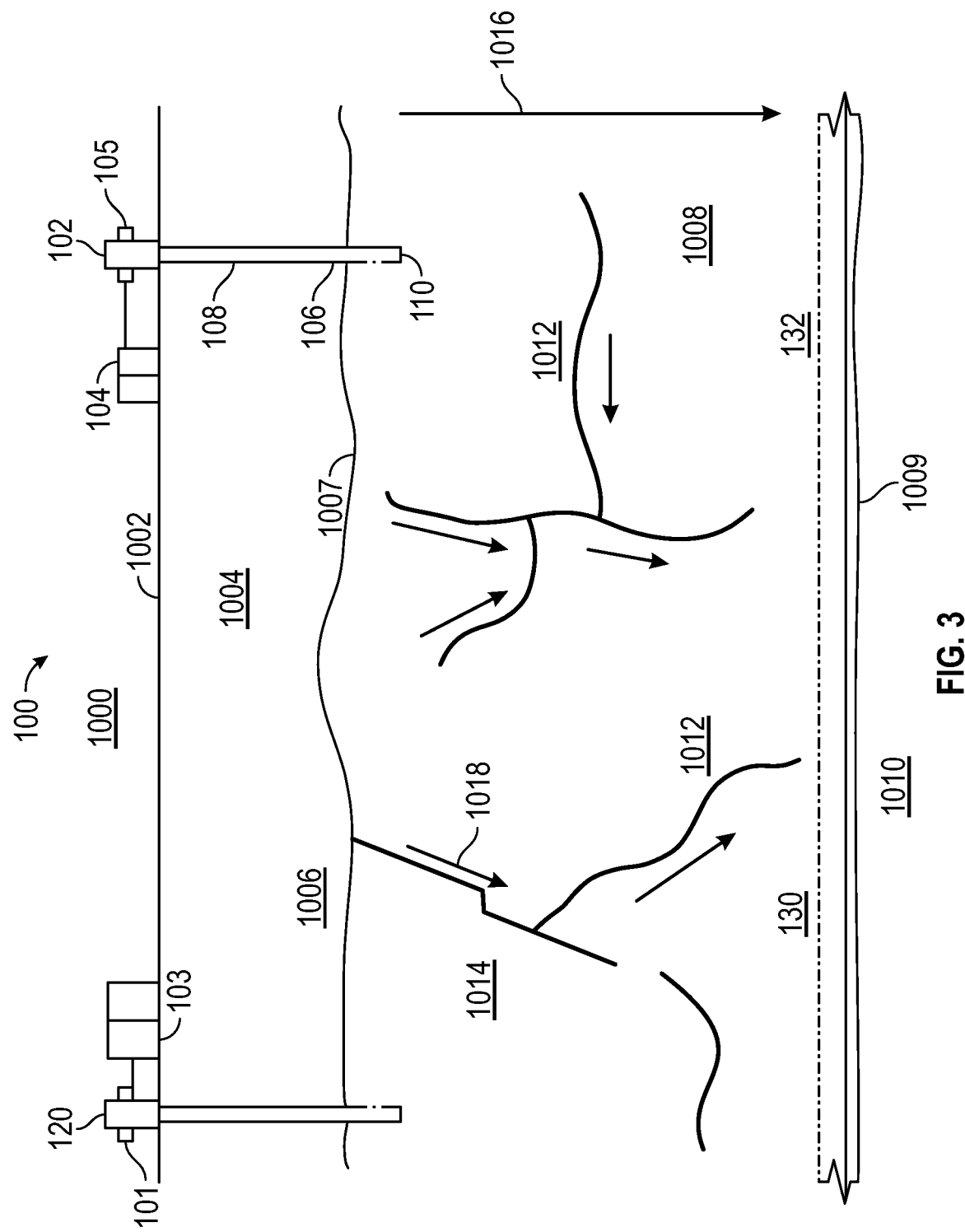
FIG. 3 is a diagram that illustrates a well environment with a treatment system in accordance with one or more embodiments.

FIG. 3 is a diagram that illustrates a well environment with a treatment system in accordance with one or more embodiments. Well environment 1000 includes surface 1002, which represents the surface of the earth. Surface 1002 may be located above water, under water, or under ice. Below surface 1002 is the subsurface 1004, comprised generally of three areas in descending depth: overburden 1006, reservoir or hydrocarbon bearing formation, or reservoir 1008, and underburden (or basement) 1010. Each portion of the subsurface (overburden, reservoir, and underburden) may comprise one or more layers of formation materials. There is an interface 1007, 1009 between each of the overburden and the reservoir and the reservoir and the underburden, respectively. If the overburden 1006 and the underburden 1010 comprise more than one layer of formation material, the formation material adjacent to the reservoir 1008 is considered impermeable for the purposes of this application. "Impermeable" means that the formation does not have permeability or other defects (fractures, faults) that permit hydrocarbons to move from the reservoir through either of the adjacent layers.

Reservoir 1008 has several aspects of note. Reservoir 1008 does not have perfect continuity; it is not homogeneous. Reservoir 1008 is shown with several zones of high permeability 1012. "High permeability" means that if hydrocarbons are motivated, they may flow through such portions of the reservoir more easily and at greater flow rates than the remainder of the formation. A specific example of a zone of high permeability is a fracture or fault 1014 in the formation. Zones of high permeability 1012 may have a direction of drainage 1018 (arrows) based upon a single or series of zones in fluid communication or connection that may channel hydrocarbons towards a recovery well 130. Such accelerated drainage of crude oil from a reservoir due to heterogeneity may be looked upon favorably early in the production cycle for hydrocarbons that flow easily or are otherwise highly mobile. However, in later phases of recovery, the heterogenous nature of the formation may provide difficulties in attempting to uniformly apply a gravity drainage $CO_2$ gas injection treatment to the formation as previously described.

The force of gravity may provide a natural force for hydrocarbon drainage in a downward direction 1016. The combination of zones of high permeability 1012 and the downward direction 1016 of hydrocarbon drainage may work together to remove motivated hydrocarbons from reservoir 1008 if a flow pathway, such as recovery well 130, is provided to remove such hydrocarbons.

Well environment 1000 in FIG. 3 is shown with a well injection system 100. Well injection system 100 includes first injection well 102. First injection well 102 includes a solution source 104 coupled to first Christmas tree 105. The solution source 104 may include a first solution and second solution according to embodiments of the present disclosure. First Christmas tree 105 may be configured to selectively permit fluid flow to and from the first injection wellbore 106, which is defined by wellbore wall 108. First injection wellbore 106 fluidly connects the upper portion of reservoir 1008 with the surface 1002 by traversing through the entire overburden 1006 and past the overburden-reservoir interface 1007. First injection wellbore 106 provides fluid connectivity with the surface 1002 through a series of perforations 110 in the portion of the wellbore wall 108 positioned in the upper portion of reservoir 1008.

Well injection system 100 includes second injection well 120. The second injection well system 120 includes a solution source 103 coupled to a second Christmas tree 101. The solution source 103 may include a first solution and second solution according to embodiments of the present disclosure. For the sake of clarity, not all the same features as shown for first injection well 102 are shown or described with second injection well 120; however, one may assume that second injection well (and other injection wells) may be essentially the same or similar in configuration and operation.

Well injection system 100 also includes recovery well 130. The recovery well 130 is shown in FIG. 3 as being horizontal. Recovery well 130 is shown with several perforations 132 along an upward directed surface. The perforations 132 permit the recovery well 130 to receive hydrocarbons that drain from the reservoir 1008 by either natural forces, artificial processes, or combinations thereof. Recovery well 130 is positioned in the lower portion of the reservoir 1008 just above the underburden-reservoir interface 1009.

Figure 4:
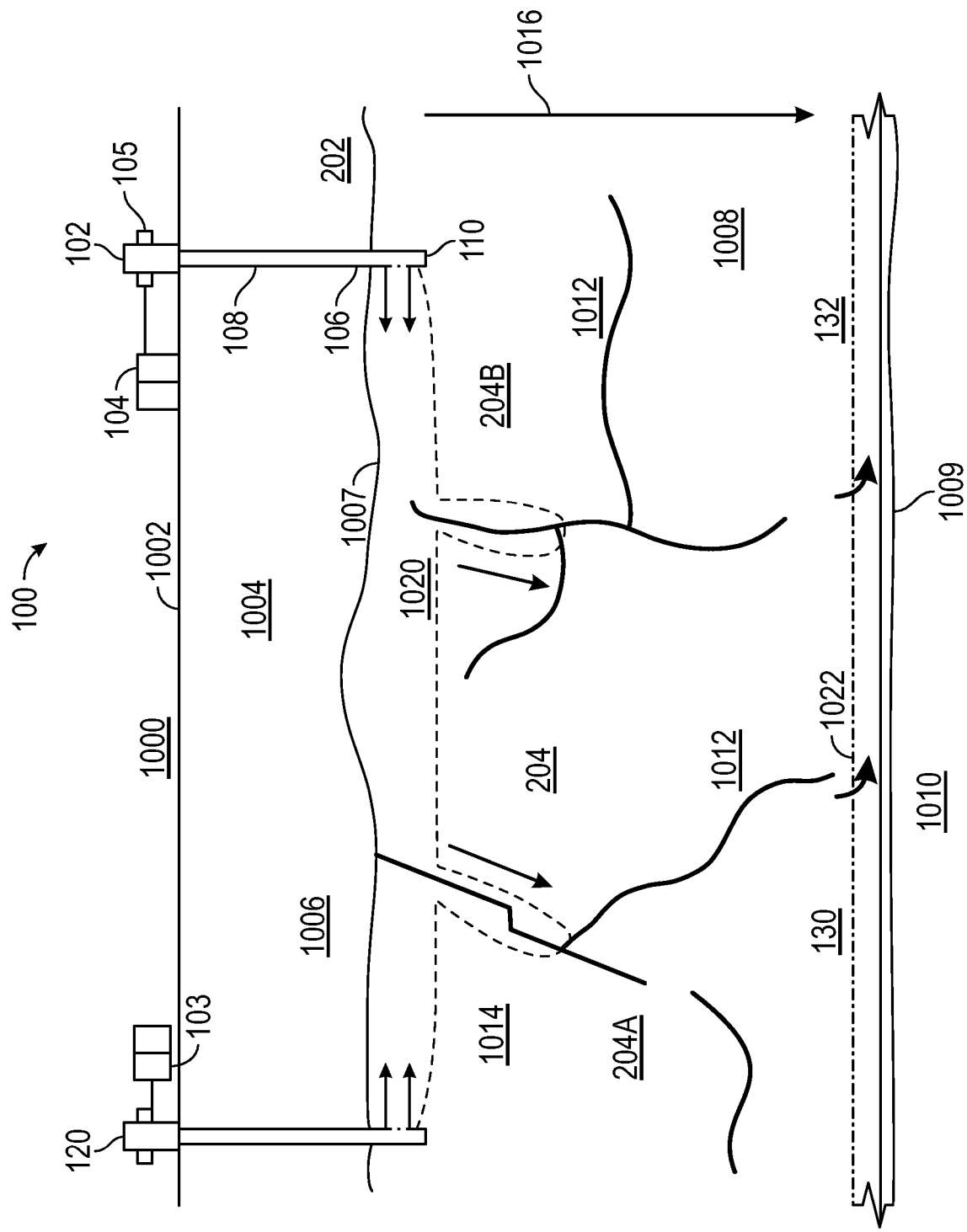
FIG. 4 is a diagram that illustrates a well environment during initial treatment in accordance with one or more embodiments.

FIG. 4 is a diagram that illustrates a well environment during an optional initial treatment in accordance with one or more embodiments. Well environment 1000 is shown undergoing the optional initial treatment. Initial treatment 202 (arrows) is being introduced into the upper part of the reservoir 1008 near the interface 1007 with overburden 1006. As a result of the treatment, a treated portion 1020 of the reservoir forms in the reservoir 1008 that is lean of mobile hydrocarbons. Hydrocarbons that have been mobilized by the initial treatment 202 have moved generally downward in the hydrocarbon bearing reservoir 1008, pushing hydrocarbons out of the formation near the bottom of the reservoir 1008. Those hydrocarbons pushed out of reservoir 1008 are draining 1022 (curved arrows) into recovery well 130.

Two other aspects of reservoir 1008 during the optional initial treatment 202 may be observed in FIG. 4. A treatment front 204 demarcates the interface between the initial treatment fluid and the remaining crude oil in the untreated portion of the reservoir 1008. The treatment front 204 is a relatively smooth curve in between bottoms of the injection wells 102, 120 except where there are zones of high permeability 1012, such as fracture or fault 1014. At fault 1014, the treatment front expands downward (204A) alongside fault 1014 in the direction of drainage 1018 is due to exposure to the initial treatment. Another treatment front downwardly expands (204B) around a zone of high permeability 1012. These two deviations in the otherwise uniform treatment front 204 represent where initial treatment 202 has followed zone of high permeability 1012 downward towards recovery well 130. If left unchecked, the initial treatment 202 would continue downward and eventually break through to recovery well 130. This would result in portions of the reservoir being under or untreated.

Figure 5:
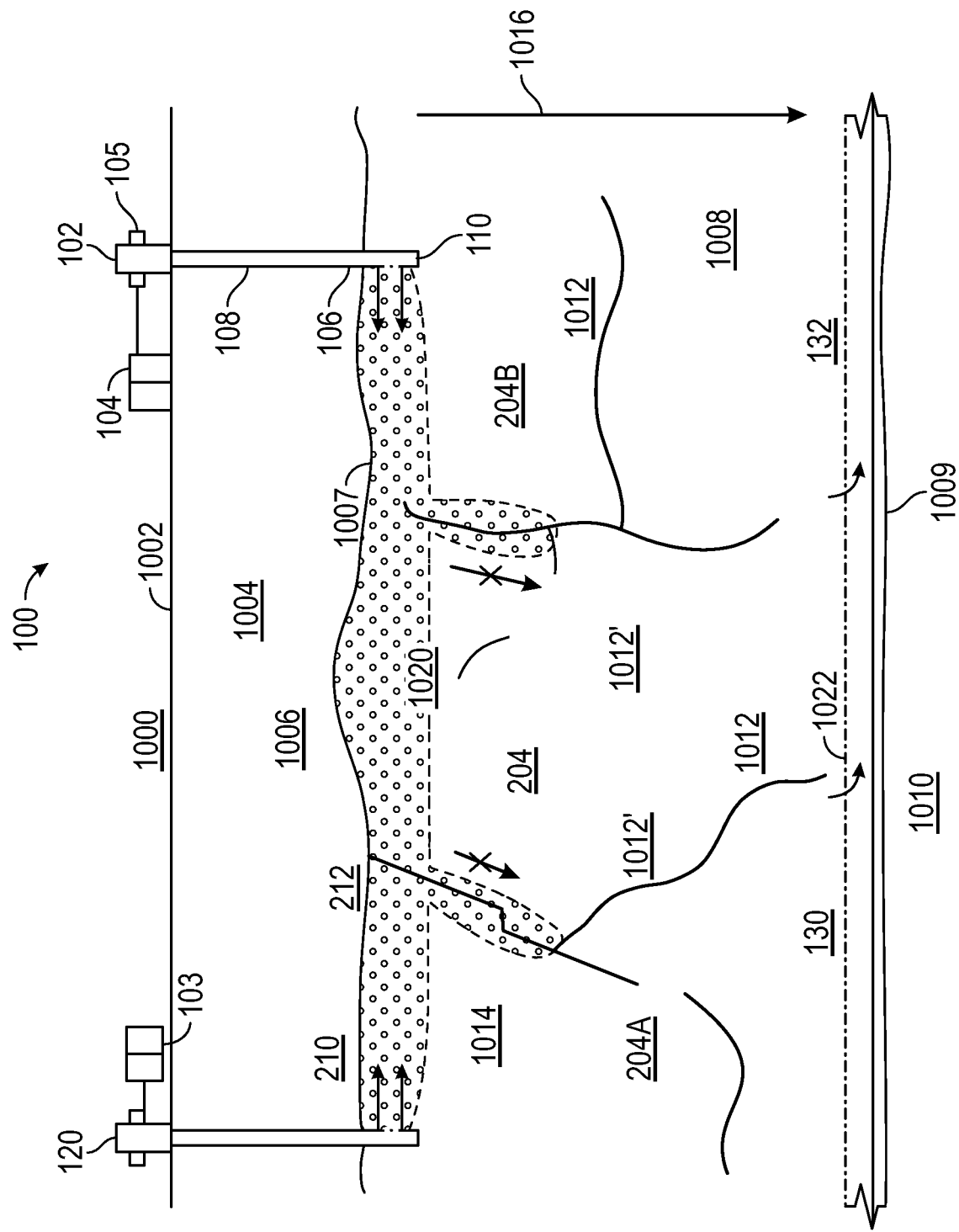
FIG. 5 is a diagram that illustrates a well environment during foam pretreatment in accordance with one or more embodiments.
Figure 6:
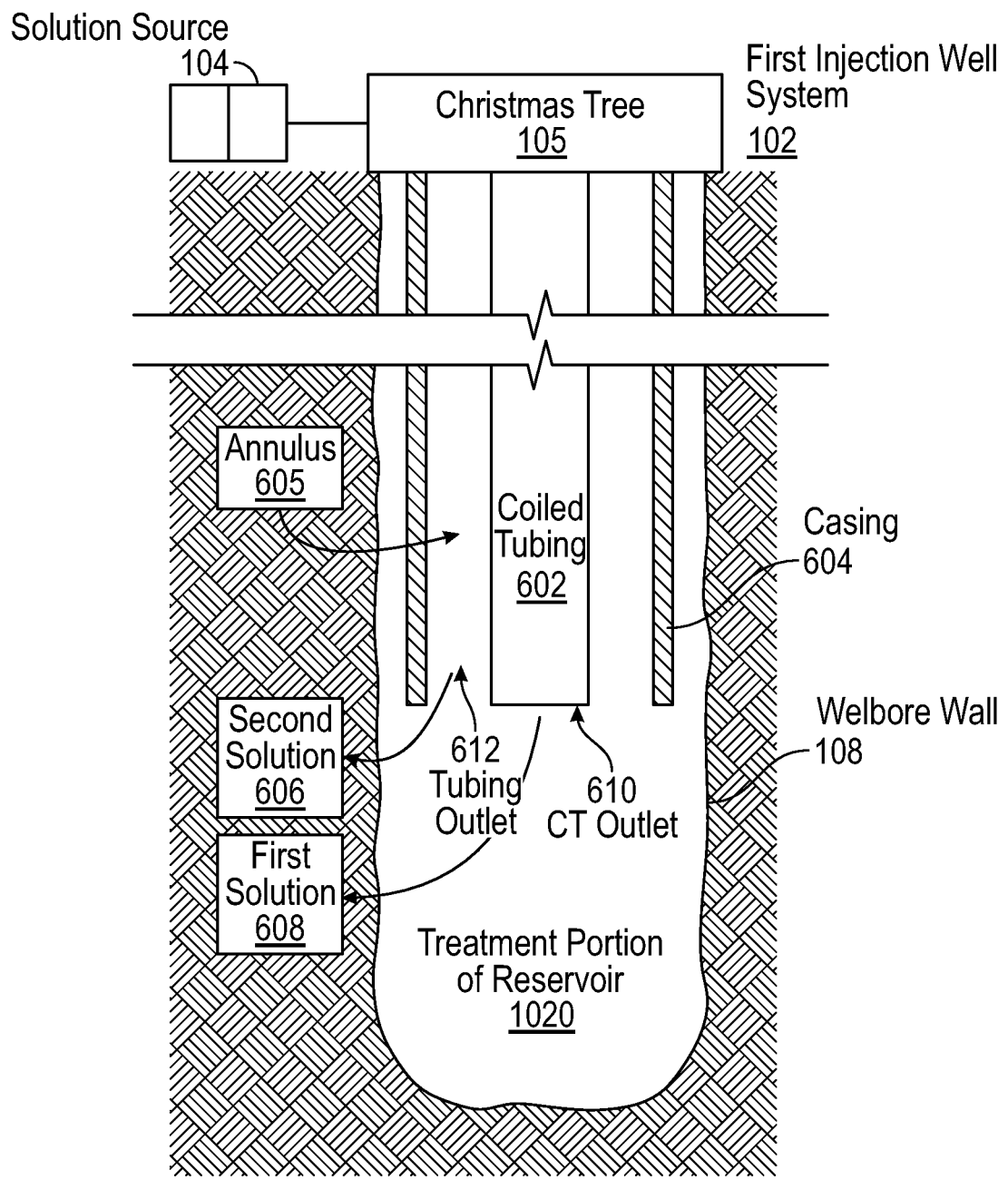
FIG. 6 is a diagram that illustrates a single injection well environment during foam pretreatment in accordance with one or more embodiments.

FIG. 5 is a diagram that illustrates a well environment during a pretreatment in accordance with one or more embodiments. In well environment 1000, foam treatment 210 is introduced into the upper part of the reservoir 1008. Foam treatment 210 comprises the first solution, the second solution, and a foaming agent in accordance with embodiments of the present disclosure. As shown in the first injection well system 102 in FIG. 6, the solution source 104 may be configured to contain the first solution and a second solution in separate vessels. The Christmas tree 105 may be configured to inject the first solution through coiled tubing 602, through which the first solution may exit via the CT outlet 610. Casing 604 may include an annulus 605 configured to inject the second solution through tubing outlet 612. Tubing outlet 612 and CT outlet 610 may be configured to facilitate contact between the first solution and second solution within the treated portion 1020 of the reservoir 1008. According to embodiments of the present disclosure, the foam barrier generates upon contact between the first solution and second solution.

Turning back to FIG. 5, the previously treated portion 1020 of reservoir 1008 is shown filled with a foam barrier 212, wherein the foam barrier 212 comprises the nitrogen gas produced by the reaction between the first solution and second solution in the presence of the foaming agent. The foam barrier 212 forms from the intimate intermixing of the components of the foam treatment 210 while in the reservoir 1008.

One aspect of the foam barrier is that once the foam barrier forms, it flows into the portions of the reservoir that has been previously treated that has high permeability, such as the portions of zone of high permeability 1012 and the portions of fracture or fault 1014 associated with expanded treatment front 204A and 204B, respectively, such as shown in FIG. 5. The foam barrier 212 may be configured to block further fluid access through these zones of high permeability 1012 and fault 1014. Drainage through the now-blocked zones of high permeability 1012' may be mitigated (arrow with X) wherein little or no fluid may flow through the blocked zones 2012'.

The foam barrier 212 may also settle due to gravity, forming a barrier along the treatment front 204, including in expanded treatment fronts 204A, 204B. The foam barrier 212 may be configured to form a fluid seal between the portion of the reservoir that has been previously treated portion 1020 and the remainder of the reservoir 1008. As shown in FIG. 5, foam barrier 212 lines the entire treatment front 204. The treatment front 204 may be stabilized and former bypass flow routes (zones of high permeability 1012 and fault 1014) may be mitigated.

Figure 7:
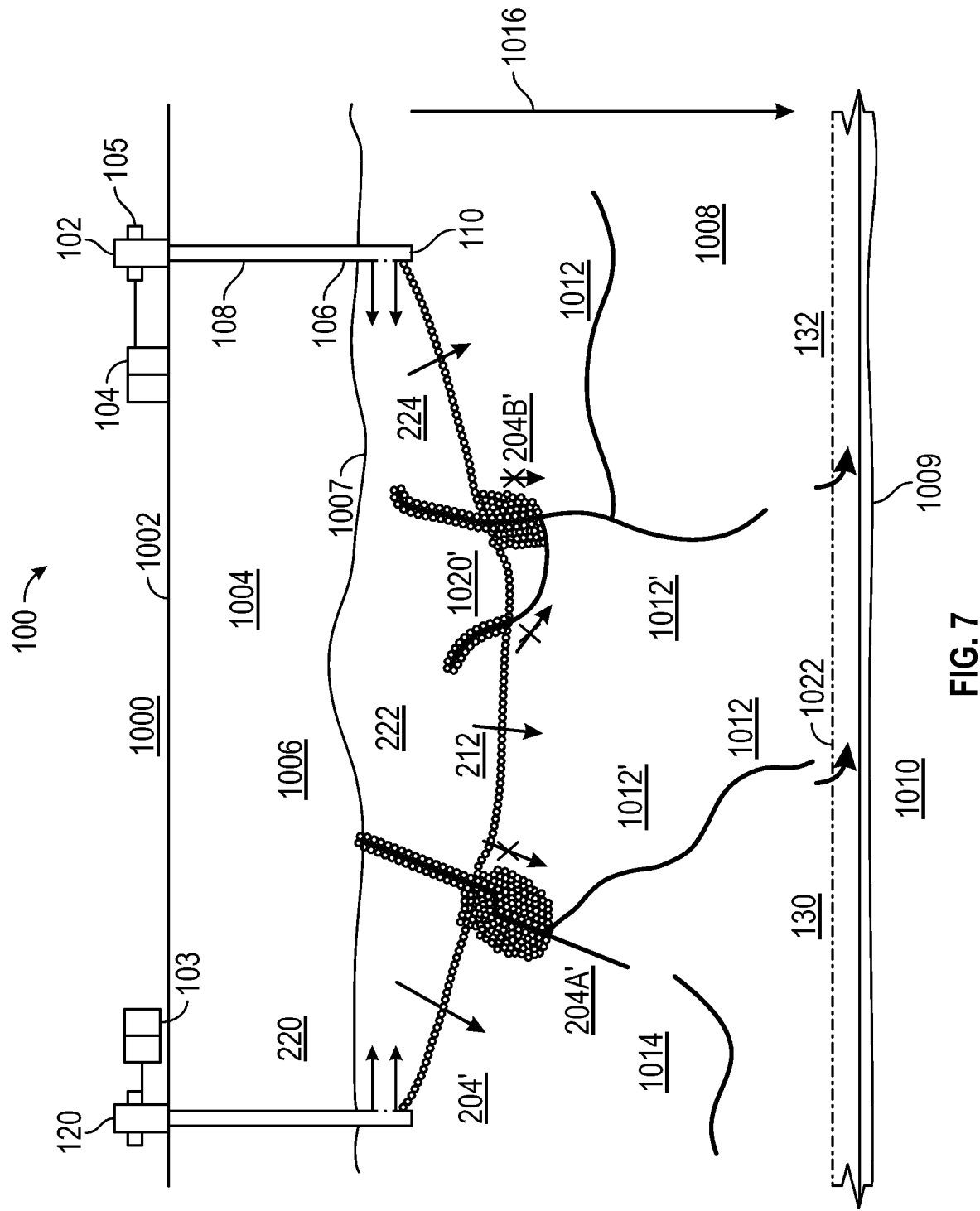
FIG. 7 is a diagram that illustrates a well environment during $CO_2$ treatment in accordance with one or more embodiments.

FIG. 7 is a diagram that illustrates a well environment during gravity drainage $CO_2$ treatment in accordance with one or more embodiments. Treated portion of the reservoir 1020' is shown as increased in volume. The increase in volume may be due to the introduction of a $CO_2$ treatment 220 from the first and second injection well systems 102, 120. The $CO_2$ treatment 220 may result in the treated portion of the reservoir 1020' forming a $CO_2$ supercritical cap 222. The specifics of the $CO_2$ treatment components and the $CO_2$ supercritical cap conditions will be described forthcoming.

As the $CO_2$ supercritical cap continues to expand generally downwards towards the recovery well 130, treatment front 204', which may be lined with foam barrier to form foam barrier front 224, may also expand downwards (arrows). As can be seen in FIG. 7, the expanded treatment fronts 204A', 204B' have not expanded any further forward; rather, the treatment front 204' has begun to advance towards their depth. Additional zones of high permeability 1012 have been exposed to the foam barrier 212 but have been mitigated (1012'). The foam barrier 212 may prevent blocked zones of high permeability 1012' from conducting the $CO_2$ treatment away from the expanding supercritical $CO_2$ supercritical cap 222 and bypassing foam barrier front 224.

As the $CO_2$ supercritical cap 222 continues to expand, hydrocarbons may continue to drain 1022 into recovery well 130. Hydrocarbons that were not previously mobilized in treated portion of the reservoir 1020' may be exposed to supercritical carbon dioxide. Such hydrocarbons may swell, the viscosity may reduce, and at least in part solvate, in the supercritical carbon dioxide. Treated hydrocarbons may drain towards recovery well 130.

Figure 8:
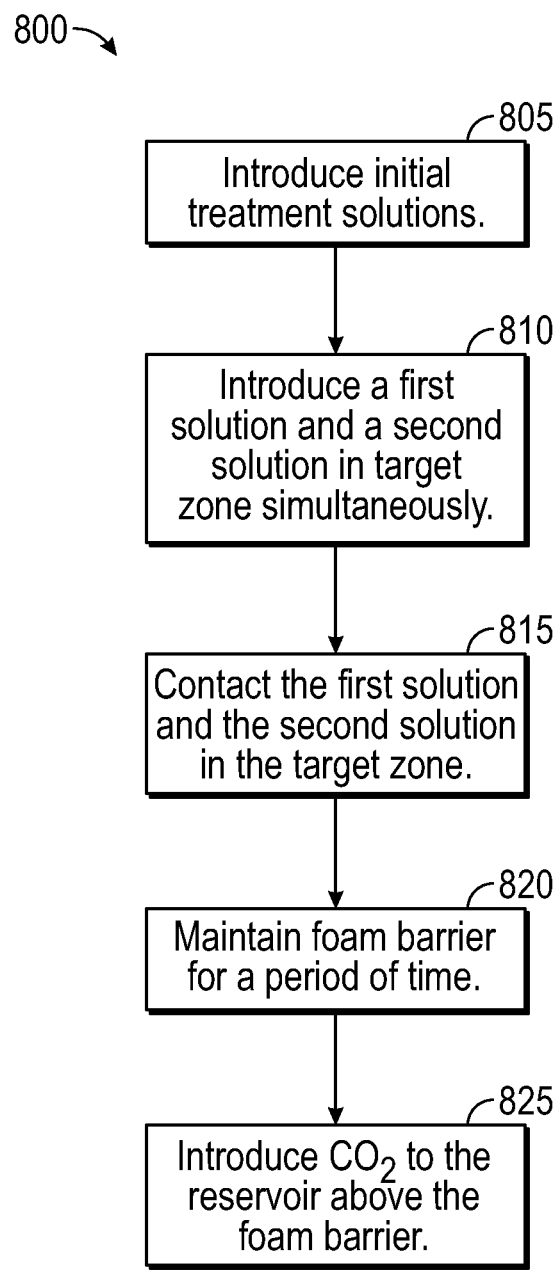
FIG. 8 is a flowchart that illustrates a method of well environment treatment in accordance with one or more embodiments.

FIG. 8 is a flowchart that illustrates a method of treating a well environment in accordance with one or more embodiments. The well system may include at least two injection wells in fluid communication with the reservoir to be treated. In one or more embodiments, an array of injection wells may be present, which may include a plurality of injection wells with surface couplings arranged in a pattern or irregularly. A given pair of injection wells may be spaced at a distance from one another to provide maximum coverage for a given reservoir. For example, injection wells may be 250 meters to 500 meters apart, and up to 1 kilometer to over 2 kilometers apart. The degree of reservoir heterogeneity and risk of gas channeling may impact the number of injection wells used for a given operation. The configuration of an injection well may be vertical, approximately vertical, deviated, approximately horizontal, horizontal, and combinations thereof.

In one or more embodiments, an injection well may be in fluid communication with a reservoir. As shown in FIG. 3, the perforations 110 of each injection well 102, 120 are shown proximate to the interface 1007. In such embodiments, the optional initial treatment and the foam treatment may be introduced into the upper part of the reservoir where the supercritical $CO_2$ cap may form. Such positioning of the perforations may limit the amount of upward migration the treatments make to reach the upper-most portion of the reservoir—the interface with the overburden—and make each treatment more effective.

The well system may also include a recovery well in fluid communication with the reservoir to be treated. The number of injection wells for a recovery well may vary, depending on the project, distance between the injection wells, and the length of the horizontal well section in the bottom producing well. In some embodiments, a recovery well may include 2 to 4 injection wells. In one or more embodiments, an array of recovery wells may be present. Each recovery well may be in fluid communication with each injection well such that fluid may be communicated through the reservoir from each injection well to each recovery well. The configuration of a recovery well may be horizontal, approximately horizontal, and combinations thereof.

In one or more embodiments, a recovery well may be in fluid communication with a reservoir. In FIG. 3, the perforations 132 of the recovery well 130 are shown proximate to the interface 1009. The perforations may be directed in an upward direction to support drainage of hydrocarbons that pool on top of the underburden 1010. Such positioning of the perforations may limit the amount of hydrocarbons that do not get treated by the treatments before $CO_2$ breakthrough occurs.

In one or more embodiments, an initial treatment may be introduced into the formation such that hydrocarbons are recovered. Method 800 of FIG. 8 shows that an initial treatment is introduced into the upper part of the hydrocarbon bearing formation 805; however, such location is not limiting in all cases. In one or more embodiments, the initial treatment applied to the reservoir is a water flood. In one or more embodiments, the initial treatment applied to the reservoir is a surfactant flood. In one or more embodiments, the initial treatment applied to the reservoir is a polymer flood. In one or more embodiments, the initial treatment applied to the reservoir is a carbon dioxide flood. In one or more embodiments, the initial treatment applied to the reservoir is a water-alternating-gas (WAG) flood. In one or more embodiments, the initial treatment applied to the reservoir is a surfactant-alternating-gas (SAG) flood.

In one or more embodiments, the method may include introducing a first solution and a second solution into a target zone of a hydrocarbon bearing formation. Method 800 of FIG. 8 shows that both the first solution and second solution are introduced into the target zone simultaneously in step 810.

In one or more embodiments, the first solution and second solution may be aqueous solutions comprising water. The water in the first solution and second solution may be any injection water, such as deionized water, high salinity seawater, low salinity seawater, and treated produced water.

In one or more embodiments, the first solution may comprise a first salt and the second solution may comprise a second salt and a forming agent, wherein the reaction between the first salt and second salt generates nitrogen gas. The concentration of the salts in the respective solutions may be based on the kinetic reaction of the salts. For example, the molarity of $NaNO_2$ in a first solution may be nearly double the molarity of $NH_4Cl$ in a second solution. In some embodiments, the concentration of the first salt may be up to 9.0 M. In some embodiments, the concentration of the second salt may be up to 6.0 M.

In one or more embodiments, the first solution, second solution, or both may further comprise a foaming agent. In one or more embodiments, the foaming agent may be a surfactant, including a nonionic surfactant, anionic surfactant, cationic surfactant, amphoteric surfactant, and combinations thereof.

The surfactant may be present in a concentration in the first solution, second solution, or both in a range of from about 0.02 wt % to 5.0 wt %. In such embodiments, the surfactant may be present in a concentration in a solution may have lower limit of one of 0.02, 0.05, 0.1, 0.2, 0.3, 0.5, 0.7, 0.9, 1.0, 1.2, and 1.5 wt %, and an upper limit of one of 3.5, 3.7, 3.9, 4.0, 4.2, 4.5, 4.7, 4.8, 4.9, and 5.0 wt %, where any lower limit may be paired with any mathematically compatible upper limit.

In some embodiments of the present disclosure, the viscosity of the generated foam may be enhanced by additives, such as dilute concentrations of polymer by up to 0.05 wt %. These polymers may include hydrolyzed polyacrylamides and sulfonated polyacrylamides. Another alternative to enhance the foam stability and/or viscosity of foam in accordance with embodiments of the present disclosure may be the use of solid nanoparticles. For example, particles such as silica nanoparticles, surface modified silica nanoparticles, iron oxides nanoparticles, and surface modified iron oxides nanoparticles may enhance foam stability and prolong the life of foams.

Some embodiments of the present disclosure may be implemented in well systems that comprise gas in the formation, such as disassociated gas (light hydrocarbons) or residual sweep gas. The presence of gas in the well systems prior to implementation of embodiments of the present disclosure may impact (e.g., decrease) the stability of the generated foam.

In one or more embodiments of the present disclosure, the method may include contacting the first solution and the second solution in a target zone of a hydrocarbon bearing formation, as shown in step 815 of Method 800 of FIG. 8. The first salt in the first solution and the second salt in the second solution may spontaneously react. In some embodiments of the present disclosure, the method may also include triggering the spontaneous reaction by lowering the pH of the salt solution (for example, the $NH_4Cl$ salt solution) or elevating reservoir temperature to at least 60° C. The reaction between the two salts in the solutions may produce a nitrogen gas. The production of nitrogen gas in the presence of a foaming agent may generate a nitrogen gas foam in-situ. The nitrogen gas foam may form the foam barrier, as shown in foam barrier 212 in FIG. 5.

The nitrogen gas foam in one or more embodiments may have limited or no miscibility with hydrocarbons in the hydrocarbon bearing formation at reservoir conditions. The limited to no miscibility with hydrocarbons may prevent the foam from defoaming through the bubble film into the hydrocarbons, causing deflation and degradation of the foam barrier.

As part of contacting the salt solutions, and subsequent nitrogen gas foam formation, the generated foam may intimately intermingle within the upper portion of the formation, forming the foam barrier. In FIG. 5, this is shown occurring in treated portion 1020 of reservoir 1008. The intimate intermingling and the formation of the foam barrier may occur proximate to the interface between the reservoir and the overburden. The target zone may be in the upper portion of the formation. The foam may generate in the target zone in-situ and, subsequently, propagate through the high permeability streaks.

In one or more embodiments, the method includes maintaining the hydrocarbon bearing formation for a period to permit the foam barrier to settle into position between the cap fluid and the crude oil. Method 800 of FIG. 8 shows that the reservoir is maintained for a period of time in step 820. The period of time may be dependent on the foam generated and propagated through the formation. As the foam barrier forms, the foam may begin to settle and migrate downward until the foam encounters the divide between the volume of the reservoir already treated and the volume of reservoir yet to be treated. In FIG. 5, this is referred to as at the treatment front 204. The foam barrier forms a foam barrier front 224, as shown in FIG. 7, that is stable at reservoir conditions and may not permit supercritical carbon dioxide to bypass through it into the crude oil below. The foam barrier may also block high permeability channels to prevent bypass as previously described.

In one or more embodiments, the method may include introducing carbon dioxide into the upper portion of the hydrocarbon bearing formation as a part of a gravity drainage $CO_2$ injection process. Method 800 of FIG. 8 shows that carbon dioxide is introduced into the upper part of the reservoir in step 825. The introduction of carbon dioxide occurs above the foam barrier front. In some embodiments, carbon dioxide injection may immediately follow producing foam in situ, which may help to ensure foam flow and propagation inside the formation.

In one or more embodiments, the carbon dioxide may be introduced into the upper portion of the hydrocarbon bearing reservoir at a pressure at or greater than the critical pressure of carbon dioxide. The critical pressure value of carbon dioxide is about 72.8 atmospheres. At wellbore temperature conditions, the carbon dioxide introduced at or greater than the critical pressure will be at supercritical condition. In some embodiments, the initial pressure of the reservoir may be greater than the critical pressure of the carbon dioxide, wherein the carbon dioxide may be at a supercritical phase upon injection. In some embodiments of the present disclosure, the carbon dioxide may have a lower density than the reservoir fluids. In these embodiments, the force of gravity may force carbon dioxide to go to the upper portion of the formation, regardless of the reservoir pressure.

In a supercritical fluid state, carbon dioxide is an excellent solvent of hydrocarbons. Supercritical carbon dioxide treatment reduces the overall bulk viscosity of crude oil, dissolves into the crude oil and causes it to swell, which forces the combination out of tight pores, and solvates the crude oil and carries it along with the fluid migration downward. Supercritical carbon dioxide also has increased polarity, which assists in mobilizing highly polar organic molecules, such as asphaltenes, aromatics, and organic compounds that contain N, S, and O heteroatoms that are double-bonded.

In one or more embodiments, the carbon dioxide may be introduced into the upper portion of the hydrocarbon bearing reservoir at a fluid flow rate at or greater than the critical gas injection rate. The mobility of injection gas is defined by $k/\mu$, where k is the permeability and $\mu$ is the viscosity. The foam treatment according to embodiments of the present disclosure may block the high permeability channels and reduce the average permeability (k). The carbon dioxide gas may also foam with some of the residual surfactant solution remaining in the target zone, thus increasing the viscosity ($\mu$). Both these effects may reduce the mobility of carbon dioxide gas and, thereby the gas injection rate may be maintained above the critical gas injection rate to result in a stable displacement of gas front without viscous fingering or channeling.

By introducing carbon dioxide into the upper portion of the reservoir, a supercritical carbon dioxide cap may form. As carbon dioxide continues to be introduced, the supercritical carbon dioxide cap may press against the foam barrier from the upward direction. This force may cause several things to occur. The foam barrier front may extend and push further downward into the reservoir, where oil in place may be exposed to the foam barrier. The foam barrier may also migrate into the high permeability channels and block fluid flow pathways towards the recovery well.

Embodiments may include regeneration of foam, particularly when foam flows in the presence of oil. For example, the generated foam may contact oil and form an emulsion that may flow similarly to foam bubbles. Foam may be regenerated by foam generation processes in accordance with the present application previously described.

As the foam barrier migrates downward, any crude oil remaining in the reservoir that is not pushed in a downward direction by the foam barrier, such as crude oil in direct contact with formation material that is oil-wet, may become saturated, solvated, and its viscosity greatly reduced, by exposure to supercritical carbon dioxide, for example. Such supercritical $CO_2$ treated crude oil may be carried downwards towards the recovery well with the expanding supercritical cap. The mobilized oil behind the foam barrier may destabilize the foam and drain faster into the untreated portion of the reservoir.

The singular forms "a," "an," and "the" include plural referents, unless the context clearly dictates otherwise.

As used here and in the appended claims, the words "comprise," "has," and "include" and all grammatical variations thereof are each intended to have an open, non-limiting meaning that does not exclude additional elements or steps.

When the word "approximately" or "about" are used, this term may mean that there can be a variance in value of up to ±10%, of up to 5%, of up to 2%, of up to 1%, of up to 0.5%, of up to 0.1%, or up to 0.01%.

Ranges may be expressed as from about one particular value to about another particular value, inclusive. When such a range is expressed, it is to be understood that another embodiment is from the one particular value to the other particular value, along with all particular values and combinations thereof within the range.

While the disclosure includes a limited number of embodiments, those skilled in the art, having benefit of this disclosure, will appreciate that other embodiments may be devised which do not depart from the scope of the present disclosure. Accordingly, the scope should be limited only by the attached claims. Thus, particular implementations of the subject matter have been described. Other implementations are within the scope of the following claims.

Although only a few example embodiments have been described in detail, those skilled in the art will readily appreciate that many modifications are possible in the example embodiments without materially departing from the described scope. Accordingly, all such modifications are intended to be included within the scope of this disclosure as defined in the following claims. In the claims, means-plus-function clauses are intended to cover the structures described as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph f, for any limitations of any of the claims, except for those in which the claim expressly uses the words 'means for' together with an associated function.

What is claimed:

1. A method for recovering hydrocarbons from a hydrocarbon bearing formation, comprising:
   introducing a first solution into a target zone of the hydrocarbon bearing formation, the first solution comprising a first salt;
   introducing a second solution into the target zone of the hydrocarbon bearing formation, the second solution comprising a second salt and a foaming agent,
      wherein the first salt and the second salt produce a nitrogen gas, and wherein the nitrogen gas and the foaming agent produce a foam formed in-situ within the target zone;

maintaining the hydrocarbon bearing formation to propagate the foam to at least one high permeability zone in the hydrocarbon bearing formation to form a foam barrier; and after forming the foam barrier, introducing $CO_2$ into an upper portion of the formation gravitationally above the foam barrier, to form a gas cap having a gas front that is separated from the hydrocarbons by the foam barrier.

2. The method of claim 1, wherein the first salt is $NaNO_2$ and the second salt is $NH_4Cl$.

3. The method of claim 1, wherein the $CO_2$ is introduced at a flow rate greater than a critical gas injection rate of the hydrocarbon bearing formation.

4. The method of claim 1, wherein the $CO_2$ is introduced at a pressure greater than the critical pressure of carbon dioxide and the $CO_2$ gas cap is maintained at a pressure greater than the critical pressure of carbon dioxide.

5. The method of claim 1, wherein at least one of the first solution or second solution is an aqueous solution.

6. The method of claim 1, wherein the nitrogen gas is formed by a spontaneous reaction between the first salt and the second salt.

7. The method of claim 1, further comprising triggering a reaction between the first salt and the second salt.

8. The method of claim 1, wherein the foaming agent is in a concentration in a range of about 0.1 to about 5.0 weight %.

9. The method of claim 1, wherein the molarity of the first salt in the first solution is double the molarity of the second salt in the second solution.

10. The method of claim 1, wherein the concentration of the first salt in the first solution is up to 9.0 M, and the concentration of the second salt is up to 6.0 M.

* * * * *